Sept. 1, 1936.    W. R. BONHAM    2,052,961
DRIVE MECHANISM
Original Filed Jan. 3, 1933    2 Sheets-Sheet 1
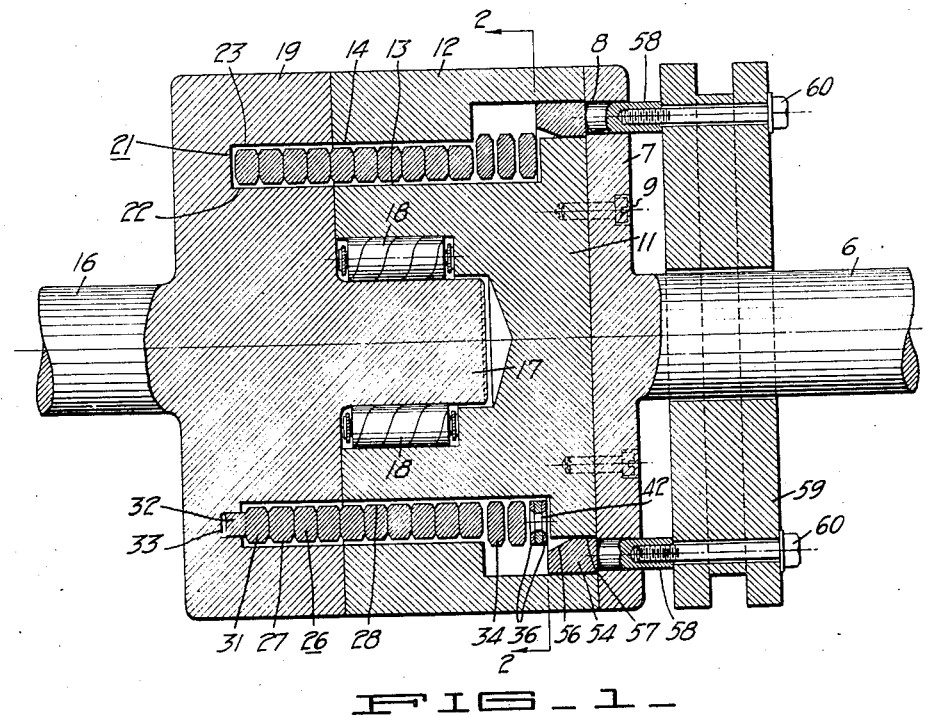
FIG-1-
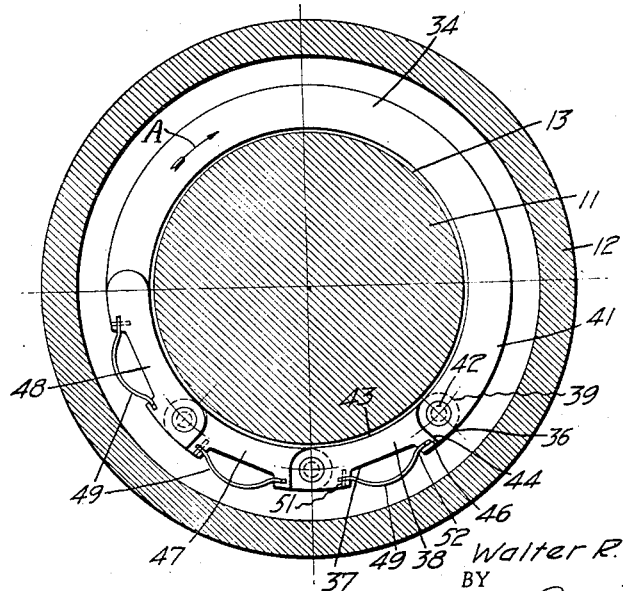
FIG-2-
INVENTOR.
Walter R. Bonham
BY
ATTORNEYS.

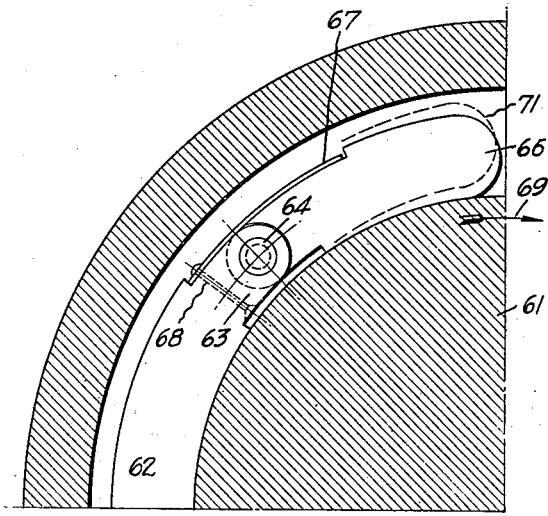
FIG_3_
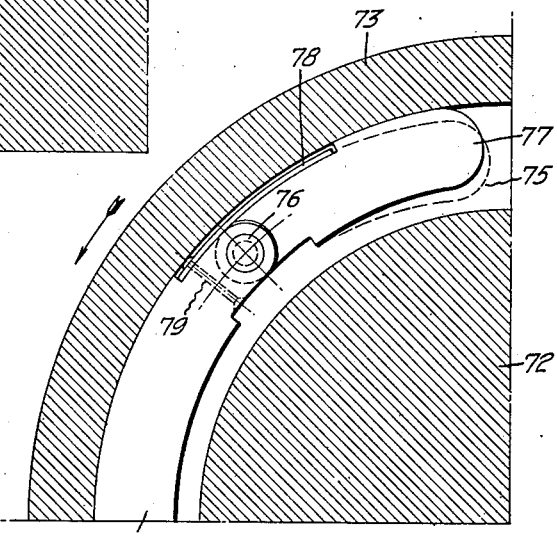
FIG_4_
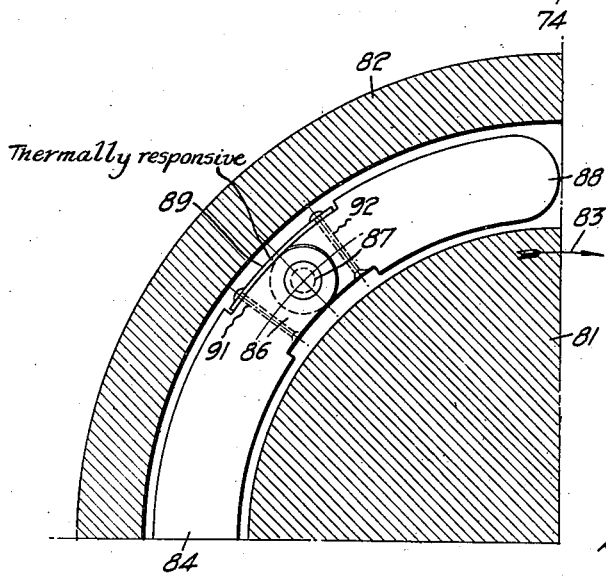
FIG_5_
INVENTOR.
Walter R. Bonham
BY
ATTORNEYS.

Patented Sept. 1, 1936

2,052,961

UNITED STATES PATENT OFFICE 2,052,961

DRIVE MECHANISM

Walter R. Bonham, Palo Alto, Calif.

Application January 3, 1933, Serial No. 649,821
Renewed March 2, 1935

17 Claims. (Cl. 192—81)

My invention relates in general to drive mechanisms of the type shown in my co-pending application entitled "Transmission", filed May 22, 1931, with Serial No. 539,258. Drive mechanisms of this character employ a generally helical member such as a coil spring for effecting a coupling or clutching action between two rotatable or relatively rotatable members such as a drive shaft and a driven shaft.

An object of my invention is in general to improve drive mechanisms of this character.

Another object of my invention is to provide an improved initial energizing action for the helical member.

A further object of my invention is to provide a drive mechanism which is automatically responsive to variations in drive conditions.

A still further object of my invention is to provide a drive mechanism in which wear of the helical member is materially reduced.

The foregoing and other objects are attained in the embodiment of my invention shown in the drawings, in which—

Figure 1 is a cross-section on a longitudinal, diametral plane of one form of drive mechanism in accordance with my invention.

Figure 2 is a transverse cross-section the plane of which is indicated by the line 2—2 of Figure 1.

Figure 3 is a transverse cross-section showing a part of a modified form of my drive mechanism.

Figure 4 is a view similar to Figure 3 but showing a further modification of my drive mechanism.

Figure 5 is similar to Figures 3 and 4, but shows a still further modification of the drive mechanism of my invention.

In its preferred form, the drive mechanism of my invention comprises a driving unit and a driven unit adapted to be coupled by an energized, helical member, such as a coil spring, and further includes a shoe frictionally engageable with one of the members for energizing the helical member.

In the form of my device disclosed in Figures 1 and 2, there is provided a driving member 6 which preferably is a shaft of the usual character terminating in a plate 7 having a plurality of axial apertures 8 therein and joined by fastenings 9 to a hub 11 and to a shell 12. The hub and the shell are thus simultaneously rotatable with the shaft 6. The hub is preferably provided with a cylindrical surface 13, while the shell is comparably provided with a cylindrical surface 14. The surfaces 13 and 14 are both co-axial with the shaft 6 and, together with the shaft, provide a driving unit.

In axial alignment with the driving shaft 6 is a driven shaft 16 having a pilot projection 17 carried by an anti-friction bearing 18 in the hub 11. The shaft 16 is likewise provided with a disc 19 having therein an annular groove 21 providing a convex cylindrical surface 22 in alignment with the surface 13, and a concave cylindrical surface 23 in alignment with the surface 14. When rotational force is applied to the shaft 6 it revolves with respect to the shaft 16. In order to couple, when desired, the otherwise freely rotatable shafts, I preferably provide a helical member 26 which conveniently takes the form of a coil spring. The spring defines a convex cylindrical surface 27 and a concave cylindrical surface 28. These surfaces are adjacent the respective surfaces on the driving shaft and the driven shaft 16 and are parallel thereto since the axis of the spring is identical with the axis of the shafts 6 and 16. One end of the helical member, such as 31, is preferably firmly related to the shaft 16, for instance, by being provided with a turned-over or projecting end 32 which is received in a recess 33 in the driven member 16. Either this interlocking connection can be utilized or the end 32 of the helical spring can make a relatively heavy frictional contact with the bottom of the slot 21.

Adjacent its other end, the helical member 26 is provided with several enlarged convolutions such as 34, and terminates in a pair of parallel bifurcations 36. The helical member when energized coils tightly upon the cylindrical surfaces 13 and 22 or expands tightly against the cylindrical surfaces 14 and 23. In order to control the energization of the coil spring, I preferably provide one or more shoes 37 which are substantially identical and each of which includes a block 38 having a centrally projecting tongue 39 thereon adapted to lie between the bifurcations 36 and to be secured to the terminus 41 of the helical member by means of a pivot pin 42. The shoe 38 is provided with an inner arcuate face 43 adapted to contact frictionally with the cylindrical surface 13. Due to the pivotal engagement of the shoe 38 and the terminus 41, the shoe is free to move radially inward towards the surface 13 but is restrained from excessive radially outward movement by abutting shoulders 44 and 46 on the terminus 41 and the shoe 38 respectively. Identical construction characterizes the comparable shoes 47 and 48 respectively.

In accordance with my invention I preferably provide means for urging the shoes 38, 47 and 48 into frictional engagement with the surface 13, when desired. For this reason each of the shoes is provided with a leaf spring 49 which is bowed radially outward adjacent its center and at one end is fastened by a pin 51 to the shoe and at the other end 52 is free to slide in a slot in the shoe. Adapted to engage the springs 49 is an annular ring 54 having a conical surface 56 and a cylindrical surface 57. The dimensions of the surface 56 are such that when the ring 54 is moved axially the surface engages the leaf springs 49 and not only compresses the springs slightly but also urges the successive shoes 38, 47 and 48 into frictional engagement with the surface 13. The ring 54 is provided with a plurality of studs 58 which project through the apertures 8 and are secured to a shifting collar 59 by means of bolts 60. When the shifting collar 59 is moved to the left, as seen in Figure 1, the conical surface 56 abuts the springs 49 and causes frictional engagement between the shoes 38, 47 and 48 and the driving member 6, so that the shoes are carried around in the direction of the arrow A (Figure 2) and are effective to energize the helical member or to cause the coil spring to wrap tightly not only upon the surface 13 but also upon the surface 22 and thereby couple the driving shaft 6 and the driven shaft 16. When the collar 59 is moved to the right, as seen in Figure 1, the ring 54 frees the successive shoes 38, 47 and 48 and permits the coil spring to resume the position shown in Figure 1 and to release or uncouple the driving member 6 and the driven member 16.

By utilizing one or more of the shoes such as 38, I am enabled to provide an initial energizing means for the helical spring which is not particularly subject to wear and which gives a relatively large, uniform surface of contact. Furthermore, in the event a shoe, such as 38, eventually does wear, it can easily be renewed or replaced without the necessity of discarding the entire helical member 26. Additionally by having the articulation or pivot connection 42 between the shoe 38, for instance, and the coil spring 26, it is feasible to move the shoe 38 without exerting any material stress upon the helical member itself, and in this fashion to allow a great deal more movement of the shoe 38 with respect to the spring than is otherwise feasible.

In Figure 3 I have disclosed a modification of the mechanism shown in Figures 1 and 2, in which a condition of operation of the mechanism is effective to energize the spring. In this modification the driving shaft 61 is encompassed by a helical member 62 which likewise encompasses a driven member, not shown but comparable to the member 16. The spring 62 at one end is fastened to the driven member (not shown) and at the other end is provided with a bifurcated terminus 63 carrying a pivot pin 64 on which is mounted a shoe 66. The shoe is normally pressed radially inward, to the full line position shown in Figure 3, by a leaf spring 67 anchored as at 68 to the helix 62. Since the shoe 66 is normally in frictional engagement with the driving shaft 61, which rotates in the direction of the arrow 69 ordinarily, the helix 62 wraps tightly about the driving shaft 61 and the driven shaft, and causes a coupling action. During rotation of the driving shaft 61, therefore, the entire mechanism, including the helical member 62 and the shoe 66, rotates therewith. At any predetermined critical speed the centrifugal force effective upon the shoe 66 is sufficient to overcome the urgency of the spring 67 and to cause the shoe to pivot radially outward about the pin 64 into the dotted line position 71 shown in Figure 3. Such movement of the shoe causes a disengagement of its frictional contact with the driving shaft 61 and permits the helix 62 to release the driving shaft and the driven shaft and thereby uncouple them. In effect, therefore, the mechanism shown in Figure 3 causes coupling of the driving and driven shafts at all speeds below a critical speed and causes an uncoupling of the driven shaft from the driving shaft at all speeds above the critical speed.

In Figure 4 I have disclosed a further modification in which the driving shaft 72 carries with it a driving shell (not shown) which are respectively aligned with a driven shaft (not shown) and driven shell 73, the parts being comparable to those shown in Figure 1. Located within the shell 73 is a helical member 74 fastened to the driving shell and terminating in a pivot pin 76 which is secured to one end of a shoe 77. Normally, the shoe 77 is held away from the driven shell 73 and occupies the dotted line position 75 shown in Figure 4, because of a leaf spring 78 which abuts the shoe 77 and is held on the helix 74 by a pin 79. In this arrangement, when the driving shaft 72 and the driving shell rotate, the shoe 77 is normally out of contact with the driven shell 73 and the member 74 effects no coupling action between the driving shell and the driven shell. Upon the attainment of a critical speed, however, the centrifugal force effective upon the shoe 77 overcomes the spring 78 and causes the shoe to pivot about the pin 76 and to move radially outward into the full line position of Figure 4, in contact with the driven shell 73. Due to the frictional engagement between the shoe 77 and the driven shell 73 at speeds above the critical speed, the helical member 74 is expanded tightly into engagement with the driving shell and the driven shell 73 and effects a coupling therebetween. With this arrangement the driving and driven members are uncoupled or declutched for all speeds below a critical speed, but are clutched together or coupled at all speeds above any selected, critical speed.

In the modification shown in Figure 5 there is provided a driving shaft 81 and a driving shell 82 which are connected for simultaneous rotation in a given direction, such as indicated by the arrow 83 in Figure 5, and are aligned with a driven shaft and shell comparable to the shaft and shell 19 of Figure 1. In this instance, a helical member 84 has one terminus fastened to the driven member (not shown) and has another terminus 86 carrying a pivot pin 87 on which is mounted a shoe 88. Interconnecting the terminus 86 and the shoe 88 is a thermally responsive element 89 which is fastened by pins 91 and 92 to the helix 84 and the shoe 88 respectively. Usually, the strip 89 is of a material having a much higher coefficient of expansion than the material of the helix or of the shoe. At ordinary temperatures, for instance, the parts occupy the relationship in Figure 5, with the shoe and the helical member both out of contact with the driving shaft 81 and the driving shell 82. Upon an increase in temperature, for instance, the strip 89 expands and rotates the shoe 88 about the pivot pin 87 in a radially inward direction to contact the driving shaft 81 and to wrap the helical member tightly about the driving shaft 81 and its axially aligned driven shaft, to effect a coupling action therebetween. When the temperature again drops to a normal value the shoe 88 is lifted from the shaft 81 in a radially outward direction, due to the contraction of the strip 89, and the parts are restored to the position shown in Figure 5. Upon a further decrease in temperature, however, the strip 89 contracts additionally and moves the shoe 88 radially outward into frictional engagement with the shell 82. Such contact, depending somewhat on the proportions and design, can be effective again to cause the helix 84 to effect a coupling connection, or can simply slip in this position until a reversal of direction of rotation occurs, in which event the shell rotating opposite to the direction of the arrow 83 in Figure 5 causes the shoe to travel counter-clockwise and to cause the helix 84 to expand into frictional engagement with the shell 82 and effect a coupling between the driving shell and the comparable driven shell.

I claim:

1. A drive mechanism comprising a driving shaft, a driven shaft aligned therewith, a helical member encompassing said driving shaft and said driven shaft, means for securing one end of said helical member to one of said shafts, and a shoe having one end free and having the other end articulated to the other end of said helical member, said shoe being adapted to contact the other of said shafts.

2. A drive mechanism comprising a driving unit having a cylindrical surface, a driven unit having a cylindrical surface, a helical member adapted to contact both of said surfaces, means for firmly relating one end of said helical member to one of said units, and a shoe articulated on the other end of said helical member adapted to contact the other of said units.

3. A drive mechanism comprising a driving unit having a cylindrical surface, a driven unit having an aligned cylindrical surface, a helical member defining a cylindrical surface adjacent said surfaces, means for firmly relating one end of said helical member to one of said units, and a shoe articulated on the other end of said helical member for engagement with the other of said units.

4. A drive mechanism comprising a cylindrical driving shaft, an aligned, cylindrical driven shaft, a helical member co-axial with said shafts, means for firmly relating one portion of said helical member to one of said shafts, and a shoe articulated on another portion of said helical member adapted to engage the other of said shafts.

5. A drive mechanism comprising a pair of shafts having co-axial cylindrical surfaces, a coil spring co-axial with said shafts and firmly related to one of said shafts, and a shoe articulated on said coil spring adapted to engage the other of said shafts.

6. A drive mechanism comprising a pair of shafts having co-axial cylindrical surfaces, a coil spring co-axial with said shafts and firmly related to one of said shafts, and a shoe articulated on said coil spring adapted frictionally to engage the other of said shafts.

7. A drive mechanism comprising a pair of aligned shafts, a coil spring adapted when energized to coil upon and couple said shafts, and means for energizing said coil spring including a shoe articulated on said coil spring adapted to engage one of said shafts.

8. A drive mechanism comprising a driving unit and a driven unit, a coil spring adapted when energized to couple said units, and means for energizing said coil spring including a shoe articulated on said spring adapted frictionally to engage one of said units.

9. A drive mechanism comprising a driving unit and a driven unit, a coil spring adapted when energized to couple said units, and means including a shoe articulated on said coil spring adapted frictionally to engage one of said units to energize said coil spring.

10. A drive mechanism comprising a coil spring adapted when energized to act as a coupling, and a friction shoe mounted to swing on said coil spring for energizing said coil spring.

11. A drive mechanism comprising a coil spring adapted to act as a coupling, and a friction shoe mounted to swing on said coil spring.

12. A drive mechanism comprising a helical member adapted to act as a coupling, and an otherwise free shoe pivoted on said helical member.

13. A drive mechanism comprising a helical member adapted to act as a coupling and having a terminus, and a shoe connected only to said member and pivotally mounted on said terminus.

14. A drive mechanism comprising a helical member adapted to act as a coupling and having a terminus, a shoe connected only to said member and pivotally mounted on said terminus, and means for restraining relative pivotal movement between said member and said shoe.

15. A drive mechanism comprising a coil spring adapted to act as a coupling, a friction shoe articulated on said coil spring, and thermally responsive means for actuating said friction shoe.

16. A drive mechanism comprising a helical member adapted to act as a coupling, an otherwise free shoe pivoted on said helical member, and a thermostat for actuating said shoe.

17. A drive mechanism comprising a member adapted to act as a coupling, means for energizing said member, and thermally responsive means independent of the operation of the drive mechanism for actuating said energizing means.

WALTER R. BONHAM.